Feb. 18, 1936.  C. A. FOX  2,031,259
ELECTRIC COOKING UTENSIL
Filed May 1, 1935  2 Sheets-Sheet 1
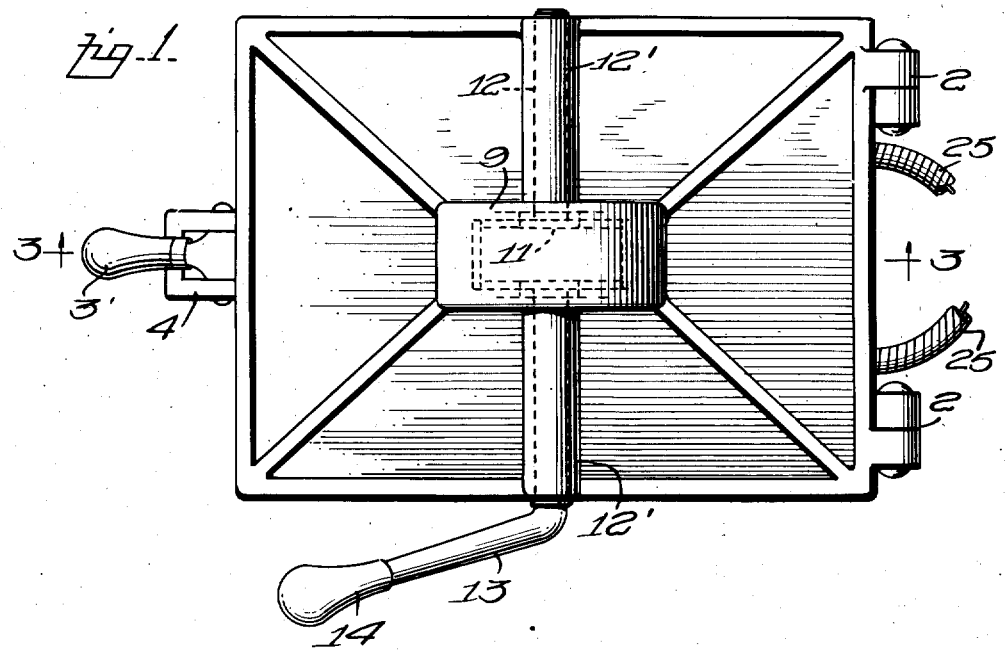
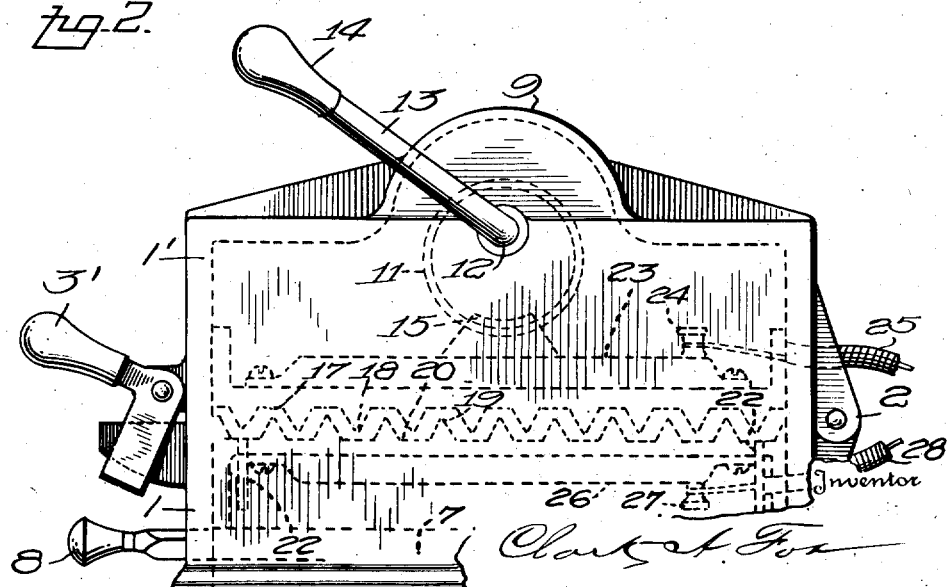

Feb. 18, 1936.  C. A. FOX  2,031,259
ELECTRIC COOKING UTENSIL
Filed May 1, 1935  2 Sheets-Sheet 2
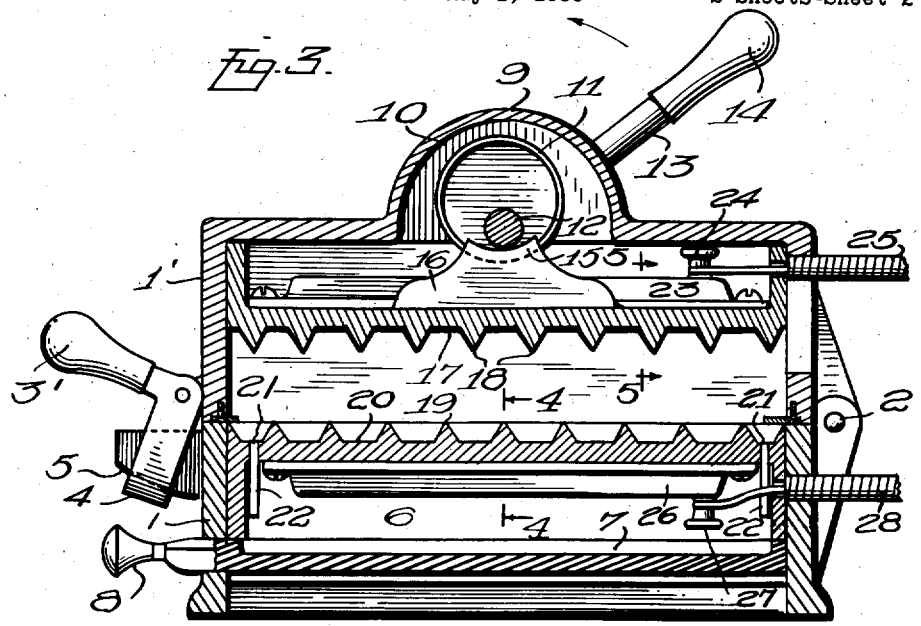
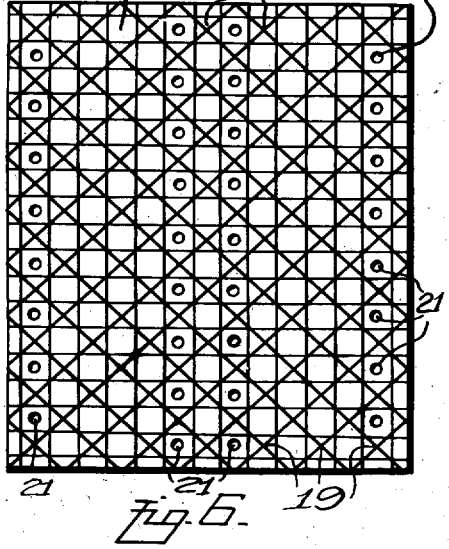
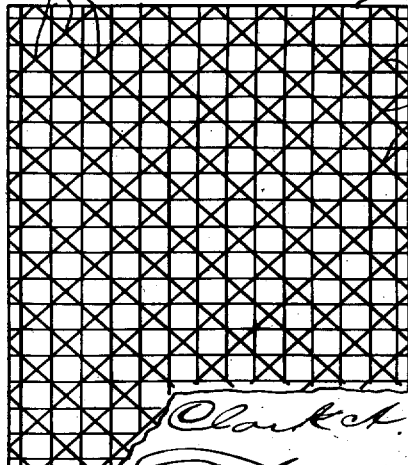

Patented Feb. 18, 1936

2,031,259

UNITED STATES PATENT OFFICE 2,031,259

ELECTRIC COOKING UTENSIL

Clark A. Fox, Nashville, Tenn.

Application May 1, 1935, Serial No. 19,289

7 Claims. (Cl. 53—5)

My invention relates to improvements in electric cooking utensils, and refers particularly to a utensil for cooking or broiling steak, although it may be used for cooking any other food where it would serve in a practical manner.

One object of my invention is the provision of an electric cooking utensil which will be capable of adjustment to a slice of meat of any desired thickness and which will cook the meat exactly as desired and in a very short time.

Another object of my invention is the provision of an electric cooking utensil which will properly cook the meat and which in addition will render the meat very tender during the cooking operation to satisfy the appetite.

Another object of my invention is the provision of a cooking utensil of the character and for the purposes stated which will be composed of few parts to insure simplicity, durability and inexpensiveness of production, which will be easy to operate and which will prove efficient and practical in every particular.

With these objects in view my invention consists of an electric cooking utensil embodying novel features of construction and combination of parts, substantially as described and claimed and as shown in the accompanying drawings, in which:

Figure 1 represents a plan view of an electric cooking utensil constructed in accordance with and embodying my invention.

Figure 2 represents a side view of the utensil with the enclosed mechanism shown in dotted lines and in normal position.

Figure 3 represents a sectional view taken on line 3—3 of Figure 1.

Figure 4 represents a sectional view taken on line 4—4 of Figure 3.

Figure 5 represents a sectional view taken on line 5—5 of Figure 3.

Figure 6 represents a plan or face view of the lower toothed plate shown in Figure 4, and Figure 7 represents a plan or face view of the toothed upper plate shown in Figure 5.

Referring by numeral to the drawings in which the same numbers of reference are used to denote like parts in all the views of the drawings:

The numeral 1 designates the lower open base section and 1', the upper open section of my cooking utensil, which sections are hinged together at 2, the upper section 1', having a handle 3, provided with a loop 4, which engages the curved face lug 5, on the base section 1, and thus acts to hold the sections when closed.

From this construction it will be noted that the utensil consists of an upper and lower open section hinged together and provided with a pivoted latch to hold the sections when closed and while the shape of the utensil is shown as rectangular it will be understood that it may be made in any suitable shape or size as may be found desirable.

In the lower or base section is a chamber or space 6 in which is placed a sliding catch basin or tray 7, which is for the purpose of receiving the juice or gravy from the meat during the cooking operation and this tray is provided with a handle 8, as clearly shown in Figure 3.

The upper section of my utensil is provided with a raised portion 9, which provides a pocket 10, to receive the cam or eccentric 11, mounted on the shaft 12, which is journalled in the sleeve 12', and is formed with the arm 13 provided with a handle 14, and the movement of said arm causes the cam or eccentric to turn to the positions shown in Figures 2 and 3, and said eccentric being engaged at 15 with the saddle 16, it follows that said saddle is the saddle 16 and upper plate 17, are vertically movable, or from the position shown in Figure 2 to the position shown in Figure 3.

It will thus be noted that the turning of the cam or eccentric through the movement of the shaft 12 imparts a vertical movement to the saddle 16, and said saddle is formed upon or connected to the top of the upper plate 17, which on its lower face is provided with pointed teeth 18, and this upper movable toothed plate co-acts with the similar teeth 19 on the lower plate 20, which is secured rigid in the lower section, and said plate 20 is provided with several rows of openings 21, from which lead the discharge pipes 22, carrying the juice or gravy from the meat to the catch basin or tray 7, as will be readily understood.

The upper movable plate or member is provided with a suitable electric heating element 23, having the contact 24 for the electric feed wire 25, while the lower stationary plate or member is provided with the electric heating element 26, having the contact 27 and to which leads the feed wire 28, and in this manner both the upper and lower plates or members are properly supplied with current to heat said plates or members.

From the foregoing description taken in connection with the drawings the operation of my electric cooking utensil will be readily understood and it will be apparent that the parts being in normal position as shown in Figure 2, the hand operated latch being released allows the upper section to be raised and the steak or meat to be cooked or broiled placed upon the lower toothed plate. The upper section is then lowered and the meat confined between the teeth of the upper and lower toothed plates while the turning of the cam or eccentric causes the teeth of both sections to cut and tender the steak while the cooking is being effected and thus the steak is perfectly broiled or cooked and at the same time is rendered tender and appetizing.

The features of merit and the advantages of my invention will be readily understood and appreciated and it will be noted that the meat is properly cooked to suit any taste or desire and is rendered tender; that the utensil will accommodate meat or steaks of any desired thickness; that the juice or gravy will be collected in a perfect manner without waste; that the article is small and compact in size to occupy a small amount of space; that the utensil can be made at low cost, and that generally in every particular the utensil will prove useful, desirable, efficient and practical.

I claim:

1. An electric cooking utensil, comprising an upper and lower open section hinged together, a toothed plate mounted in the lower section, a movable toothed plate mounted in the upper section, and means connected with the upper section for moving said section with reference to the lower section said means comprising a shaft mounted in the upper hinged section, and an element carried by said shaft and adapted to engage the said movable toothed plate to impart a vertical movement to said plate upon rotation of said shaft.

2. An electric cooking utensil, comprising an upper and lower open section hinged together, a toothed plate rigidly mounted in said lower section, a movable toothed plate mounted in the upper section, a manually operated shaft journalled in the upper section, a cam or eccentric on said shaft, said cam or eccentric being adapted to engage the upper toothed plate to vertically move said plate.

3. An electric cooking utensil, comprising an upper and lower section hinged together, a latch for holding said sections when closed, a toothed plate rigidly mounted in the lower section, a toothed plate movably mounted in the upper section, means for draining said lower plate, and means for vertically moving the upper toothed plate said means comprising a shaft mounted in the upper section and having a handle at one end to rotate said shaft, and a rotatable element on shaft connected with said upper section.

4. An electric cooking utensil, comprising an upper and lower section hinged together, a compartment in said lower section, a catch basin or tray slidingly mounted in said compartment, a toothed plate mounted rigidly in the lower section, drain means leading from said plate to the tray, an upper movable toothed plate mounted in the upper section, a saddle carried by said upper toothed plate, a shaft journalled in the upper section and having an operating handle, a cam on said shaft operating in conjunction with said saddle to move said upper toothed plate, and electric heating elements associated with said upper and lower toothed plates for heating said plates.

5. An electric cooking utensil, comprising an upper and lower section, a hinge connection at the inner edge of said sections, a curved lug at the outer edge of the lower section, a hand operated pivoted catch at the outer edge of the upper section having a loop to engage the curved lug to hold the sections closed, a toothed plate rigidly mounted in the lower section, means for draining said plate, means for catching the juice from said plate, an upper movable plate formed with teeth to co-operate with the teeth of the lower plate, manually operated means to vertically move said upper toothed plate, and electric heating elements carried by said upper and lower toothed plates to heat said plates said manually operated means for raising and lowering the upper toothed plate, comprising a rotatable shaft transversely mounted in said upper section, a cam on said shaft, and means on the said upper toothed plate engaged by said cam to vertically move said upper toothed plate.

6. An electric cooking utensil, comprising an upper and lower casing section hinged to swing open, a plate rigidly mounted in the lower section, a plate movably mounted in the upper section and between which plates is placed food to be cooked, and manually operated means for moving said upper plate for co-action with the lower plate said means comprising a shaft passing transversely through the upper section and having a projecting end to form a handle, and a connection between said shaft and the movable plate operated by the handle for vertically moving said movable plate.

7. An electric cooking utensil, comprising an upper and lower section hinged together to form a box or casing, a plate rigidly mounted in the lower casing section, a plate movably mounted in the upper section and co-acting with the lower section to engage the faces of the meat, manually operated means for moving the upper plate comprising a shaft rotatably mounted in the upper hinged section of the utensil, an element on said shaft for engaging and moving said upper plate, and means for supplying heat to said upper and lower plates.

CLARK A. FOX.